(12) United States Patent
Edwards

(10) Patent No.: US 8,670,874 B2
(45) Date of Patent: Mar. 11, 2014

(54) METHOD AND APPARATUS FOR ENERGY AND EMISSION REDUCTION

(75) Inventor: Timothy Alwynn Edwards, Cottesloe (AU)

(73) Assignee: Metro Power Company Pty Ltd, West Perth (AU)

( * ) Notice: Subject to any disclaimer, the term of this patent is extended or adjusted under 35 U.S.C. 154(b) by 233 days.

(21) Appl. No.: 12/996,727

(22) PCT Filed: Jun. 11, 2009

(86) PCT No.: PCT/AU2009/000729
§ 371 (c)(1),
(2), (4) Date: Dec. 7, 2010

(87) PCT Pub. No.: WO2009/149500
PCT Pub. Date: Dec. 17, 2009

(65) Prior Publication Data
US 2011/0112698 A1 May 12, 2011

(30) Foreign Application Priority Data
Jun. 12, 2008 (AU) ................................ 2008902994

(51) Int. Cl.
*G06F 19/00* (2011.01)
(52) U.S. Cl.
USPC .......................................... 700/291; 702/32
(58) Field of Classification Search
USPC ........................................... 700/291; 702/32
See application file for complete search history.

(56) References Cited

U.S. PATENT DOCUMENTS

| 5,970,426 | A  * | 10/1999 | Mandel et al. ................... 702/32 |
|---|---|---|---|
| 6,732,055 | B2 * | 5/2004 | Bagepalli et al. ................ 702/32 |
| 6,865,509 | B1 * | 3/2005 | Hsiung et al. .................. 702/182 |
| 7,065,475 | B1 * | 6/2006 | Brundobler ....................... 703/2 |
| 7,272,530 | B2 * | 9/2007 | Hsiung et al. .................. 702/182 |
| 7,333,861 | B2 * | 2/2008 | Rosenof et al. .................. 700/36 |
| 7,421,348 | B2 * | 9/2008 | Swanson ......................... 702/32 |
| 7,698,074 | B1 * | 4/2010 | Cybulski ......................... 702/32 |
| 2003/0061091 | A1 | 3/2003 | Amaratunga et al. |
| 2004/0226013 | A1 | 11/2004 | Mariotti et al. ............... 718/100 |
| 2005/0288812 | A1 * | 12/2005 | Cheng et al. .................. 700/109 |
| 2006/0089730 | A1 * | 4/2006 | Rosenof et al. .................. 700/36 |
| 2007/0143045 | A1 | 6/2007 | MacGregor |
| 2007/0260563 | A1 * | 11/2007 | Fan et al. ........................ 706/12 |

OTHER PUBLICATIONS

International Search Report, mailed Jul. 29, 2009, for PCT/AU2009/000729, 3 pages.
Datta et al., "Application of Neural Networks for the Prediction of the Energy Consumption in a Supermarket," Proceedings of the CLIMA 2000 Conference, Belgium, Sep. 2007, 10 pages.

(Continued)

Primary Examiner — Michael D Masinick
(74) Attorney, Agent, or Firm — Seed IP Law Group PLLC

(57) ABSTRACT

A method of performing energy estimations operations in an intensive energy consuming site or system environment, the method comprising the steps of: (a) inputting a series of energy, emission and influencing data variables related to the intensive energy consuming site or system environment; (b) performing a first energy use prediction operation utilising a first prediction technique; (c) performing a second (simultaneous) similar energy use prediction operation utilising a second prediction technique; (d) correlating the results of the two techniques and; (e) providing a pass or fail signal depending on the level of correlation between the two techniques.

8 Claims, 2 Drawing Sheets

(56) References Cited

OTHER PUBLICATIONS

Geon, "Using Artificial Neural Network to Predict Power Plant Turbine Hall Key Cost Drivers," Universiti Teknologi Malaysia, May 2007, URL = http://eprints.utm.my/view/divisions/FKA.html, 134 pages.

Kavi et al., "A Performability Model for Soft Real-Time Systems," Proceedings of the Twenty-Seventh Annual Hawaii International Conference on System Sciences, Wailea, Hawaii, Jan. 4-7, 1994, pp. 571-579.

European Search Report, mailed Jul. 11, 2011, for EP 09761165.1, 6 pages.

* cited by examiner

METHOD AND APPARATUS FOR ENERGY AND EMISSION REDUCTION

CROSS REFERENCE TO RELATED APPLICATIONS

This application is a U.S. national stage application filed under 35 U.S.C. §371 of International Patent Application PCT/AU2009/000729, accorded an international filing date of Jun. 11, 2009, which is incorporated herein by reference in its entirety.

FIELD OF THE INVENTION

The present invention relates to an Energy and Emission Management ("E2M") system and methods for reducing the costs of energy consumption and greenhouse gas emissions for Intensive Energy Consuming Systems and Sites ("IECSS") found in areas such as manufacturing, industrial and resources sector.

BACKGROUND TO THE INVENTION

The manufacturing, industrial and resources sector contribute a large volume of greenhouse gas emissions through their intensive use of energy for production processes. Energy expenditure by the sector is often one of the largest single cost items, and with dwindling natural resources of coal, oil and gas the price for energy is continually escalating. The collective various government and non-government organisations throughout the world are starting to understand the cost to the global community of Climate Change caused by Greenhouse Gas ("GHG") emissions.

Some governments have introduced measures to ensure that consumers who use polluting energy (ie. Electricity from fossil fuel, diesel from oil) are economically disadvantaged to those who use renewable or lower emission energy (ie Renewable Electricity, biodiesel). One form of these consist of Emissions Trading Mechanisms, and are continuing to be implemented, placing a price on the greenhouse emissions created by the energy consumer.

The traditional cost of energy expenditure by the Industrial sector now can also have a mutual, but exclusive cost of GHG emission to be considered and managed. Energy efficiency or predictive methods for making prediction on energy consumption alone may not be not enough to maximize cost savings.

Typical systems and methods have been based on the singular (energy consumption) alone. An example can be found in United States Patent Application Publication No 2003/0061091 to Amaratunga et al, and see U.S. patent application Ser. No. 11/613,728 to MacGregor, the contents of which are hereby incorporated by cross reference.

Any discussion of the prior art throughout the specification should in no way be considered as an admission that such prior art is widely known or forms part of common general knowledge in the field.

SUMMARY OF THE INVENTION

In accordance with a first aspect of the present invention, there is provided a method of performing energy estimations operations in an intensive energy consuming site or system environment, the method comprising the steps of: (a) inputting a series of energy, emission and influencing data variables related to the intensive energy consuming site or system environment; (b) performing a first energy use prediction operation utilising a first prediction technique; (c) performing a second (simultaneous) similar energy use prediction operation utilising a second prediction technique; (d) correlating the results of the two techniques and; (e) providing a pass or fail signal depending on the level of correlation between the two techniques.

The prediction techniques can include one of at least Regression and Artificial Neural Network techniques. The method can be performed to determine the environments efficiency or to predict or forecast the future energy needs and/or related emissions of the environment. The method can also further include the steps of: performing at least one further energy use prediction operation utilising a further different prediction technique; and providing a further output signal indicative of the level of correlation between all the energy use prediction operations.

In accordance with a further aspect of the present invention there is provided a system for performing energy estimations operations in an intensive energy consuming site or system environment, the system including: input means for sensing and inputting a series of data variables relating to energy or emissions from the site or system environment; data storage means for storing time series data from the input means; first prediction unit trained from data stored in the data storage means utilising a first prediction technique to output a first prediction; second prediction unit trained from data stored in the data storage means utilising a second different prediction technique to output a second prediction; and comparison means for comparing the first and second prediction and outputting a measure of the difference there between.

BRIEF DESCRIPTION OF THE PREFERRED AND OTHER EMBODIMENTS

Preferred forms of the present invention will now be described with reference to the accompanying drawings in which.

DESCRIPTION OF PREFERRED EMBODIMENT

Figure 1:
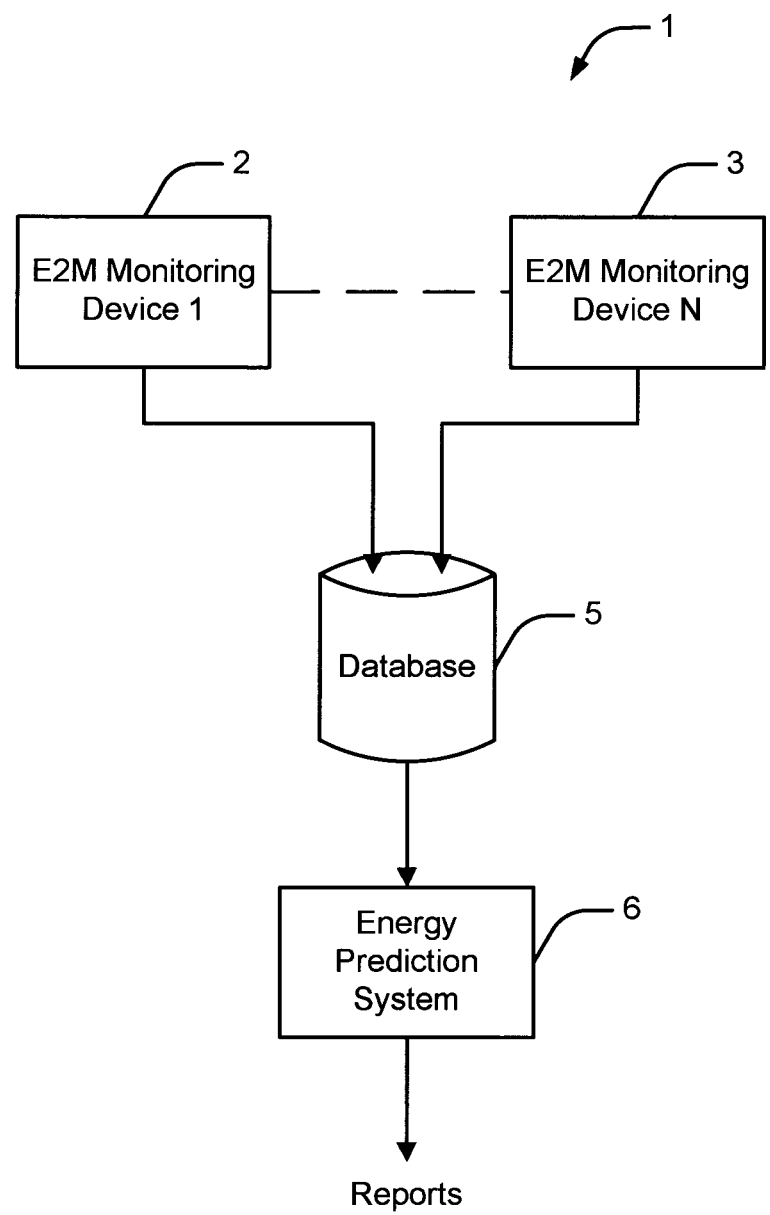
FIG. 1 illustrates schematically a simplified block diagram of the preferred embodiment of the invention representing the system for Energy and Emission Management (E2M)

The preferred embodiment provides a predictive system and method of management that integrates Energy Consumption and Greenhouse-gas Emissions (ECGE) business intelligence into an overall strategy for managing the energy and greenhouse emissions of the IECSS. The system ideally compares Real-time (or near Real Time) ECGE with the hypothetical target values obtained from the predictive systems so deviances from optimal cost performance can be constrained through actions, such as maintenance, behavioural change, training of personnel or rescheduling of production.

The ability to predict energy consumption has a number of beneficial side effects. It allows energy waste to be minimised, efficiency to be identified for retention and energy supplies to be selected at the lowest cost and with the lowest GHG emission content. Sophisticated statistics in the form of regression analysis provide predictive systems and methods as tools for energy management. The systems and method of prediction in the aforementioned patent specification use this method. Alternatively, other techniques such as modelling prediction involving Artificial Neural Networks can be used. For example, U.S. patent application Ser. No. 11/613,728 to MacGregor discloses such a system.

Regression and Artificial Neural Networks are two very different forms of statistical analysis, and arrive at their prediction using different processes. Regression estimates the weights to apply to a single equation, whereas the Artificial Neural Network approach uses a system of equations represented by a series of interconnected switches. A single input in an Artificial Neural Network can influence multiple intermediate switches that in turn influence the final prediction, often making it difficult to find how an individual input is affecting the predicted outcome. If the single input influence is unknown, then the precision of the neural weighting scheme is unknown. On the other hand, Regression specifies how much each input impacts the prediction, and how accurately it was able to estimate the impact.

While the Artificial Neural Network technique can yield more powerful predictions, it does a poorer job of explaining why it is working or how much confidence it has in the prediction. Present methods and systems of energy management for energy and cost efficiency using predictive statistics use either Regression or Artificial Neural Network statistics. Regression gives outputs which the energy management system or method can use to investigate efficiency improvements, whereas Artificial Neural Networks provide less information for anomaly investigation for efficiency improvements. Artificial Neural Networks can provide greater forecast prediction capabilities than Regression, but have no support to verify the confidence of the predictions for (say) optimisation hypothesis tests, demand management, energy market trading and/or emission trading.

In the preferred embodiments, there is provided a predictive method and system for running Regression and Artificial Neural Networks (and any suitable other statistical methods such as Support Vector Machines) simultaneously on the same datasets to enable cross-verification of predictions appropriate to the task. In particular, simultaneously use of Regression for energy-consuming optimisation applications with Artificial Neural Networks (and others) as the validation check, and using Artificial Neural Networks for forecast prediction applications with Regression (and others) as the validation check. This may be provided continuously or at regular periodic intervals for ongoing predictions.

The preferred embodiments provide an Energy and Emission Management ("E2M") system and methods for reducing the costs of Energy Consumption and Greenhouse-gas Emissions ("ECGE") for Intensive Energy Consuming Systems and Sites ("IECSS") found in the manufacturing, industrial and resources sector using simultaneous prediction algorithms of (at least) Regression and Artificial Neural Networks to cross-verify the prediction outputs. The term 'Simultaneous' includes existing, occurring and operating at the same time, or within the shortest time-sequence practical to achieve near-synchronism.

The preferred embodiments include a means for measuring the ECGE of the IECSS, means for determining information regarding the operation of the IECSS, means for measuring or obtaining variables that may influence the rate of ECGE of the IECSS, means for transmitting measurement and operational information about the IECSS to a means for receiving the information, means for analysing and evaluating the information, means for deriving energy efficiency algorithms and models for base-line benchmark, expected or predicted amounts of ECGE by the IECSS, means for cross-checking the confidence interval for verification of the base-line, expected or predicted amounts of ECGE by the IECSS, and means for providing access to the base-line, expected or predicted values of ECGE for the purpose of ECGE management activities, and a means for measuring and validating the results of the ECGE management activities.

Turning initially to FIG. 1 there is shown schematically an Energy and Emission Management (hereinafter called "E2M") system 1 for Intensive Energy Consuming Systems and Sites (hereinafter called "IECSS") normally found in the manufacturing, industrial and resources sector. The term "Energy" means all forms of energy and fuel that are consumed to operate the IECSS, and include, but are not limited to electricity, natural gas, flammable gas, diesel, gasoline, oil-derived fuels, biofuels, biomass, sulphur, and coal. The term "Emission" means greenhouse gas air emission from the direct or in-direct use of Energy and may include $SO_2$, NO and $CO_2$. The term "Intensive" means those manufacturing, industrial or resource sector systems or sites that consume, for example, a minimum equivalent of 20,000 MWh or 80,000 GJ of energy per annum of operation. Examples of IECSS include: manufacturing sector (brick and tile factories, ceramic factories, automotive factories), industrial sector (paper and wood pulp production, chemical production, steel/metal foundry and production, specialist gas production, cement production, aluminium smelting), resources sector (mineral processing plants, petrochemical refineries, gold/copper/nickel/iron ore mines and processing plants).

The E2M system continuously monitors the IECSS by collecting data from E2M monitoring devices e.g. 2, 3 which can include energy metering, energy sub-metering, emission monitoring and energy-influencing variables directly from field instrumentation and control devices at the IECSS using communications devices to transfer data from the IECSS to the remote data centre for manipulation. The monitoring device data is stored in a database 5. The data is then used by prediction system 6 for predicting energy usage. The E2M Monitoring Devices e.g. 2, 3 can include measurement systems and tools to measure, analyse, evaluate, predict and cross-check amounts of Energy Consumed and Greenhouse-gas Emissions (hereinafter call "ECGE") by the IECSS and associated methods and use of such measurement systems and tools.

The E2M system 1 continuously compares actual ECGE against a predicted ECGE and analyses variances for identifying opportunities to improve energy efficiency and reduce greenhouse emission for the purpose of saving costs.

The preferred embodiments use simultaneous prediction algorithms of (at least) Regression and Artificial Neural Networks to cross-verify the predictions. In particular, the preferred embodiments are related to continuously improving the productivity-related use and supply of energy, while minimising the respective direct and indirect greenhouse gas emissions for cost savings and environmental sustainability. In the preferred embodiment, there is provided a method and apparatus for producing a more accurate estimate of both current site efficiency and predictions or forecasts of future requirements.

Figure 2:
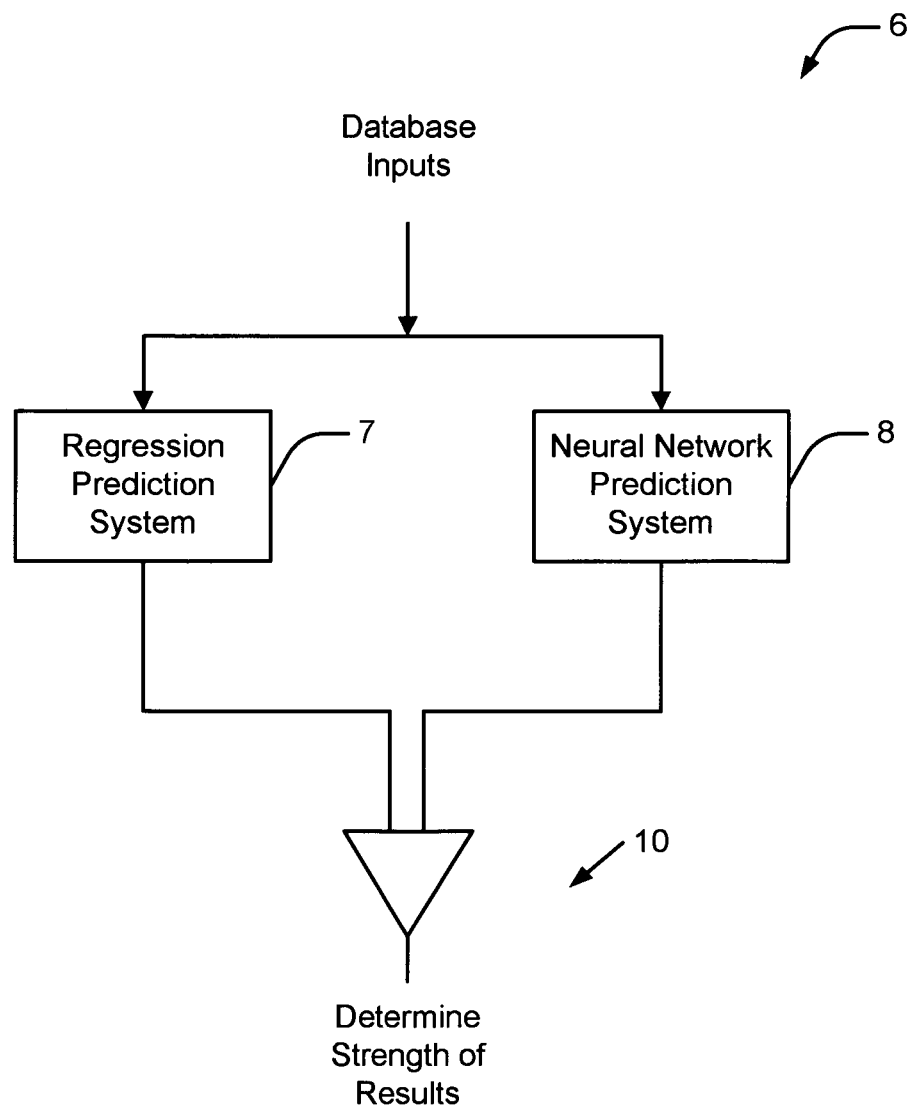
FIG. 2 illustrates the energy prediction system of FIG. 1 in more detail.

Turning now to FIG. 2 there is illustrated the Energy Prediction System in more detail. The database inputs are forwarded to a Regression prediction system 7 and an Artificial Neural Network prediction system 8, each of which output a prediction based on the input data. The preferred embodiment utilizes at least two models to produce estimates of likely outcomes. In a first embodiment, there is provided a first Artificial Neural Network model for estimating likely outcome and a second Regression model of estimating a likely outcome. The first model can be based around a similar architecture to that disclosed by Macgregor (with the exception of input data derived as described in Amaratunga et al) and the second Regression model can be similar to that based around Amaratunga et al.

In the preferred embodiment these two (or more) models receive the relevant inputs from the environment of the specific IECSS and simultaneously output estimations of energy requirements. The method of the preferred embodiment then goes through an important step of cross correlating the outputs for prediction verification.

Where a measure of site efficiency is required, the Regression process is utilized as the primary prediction and the Artificial Neural Network model is provided as the verification prediction. Where divergence between the two models is beyond a predetermined limit, the prediction output 10 is flagged as inadequate for the particular data sample. Examples of divergence may be caused by IECSS system upsets or erroneous data inputs due to system malfunction or calibration Where a further-into-the-future prediction or forecast is required, the Artificial Neural Network model output is utilized for the primary prediction. The Regression model output is utilized as the verification prediction. Where the divergence between the two models is beyond a predetermined limit, the prediction output is again flagged as inadequate.

It has been found that utilizing multiple models simultaneously and cross checking there between provides for a substantially more accurate prediction network than that provided by the prior art.

EXAMPLES

One example of the E2M in operation may indicate that the overall IECSS energy efficiency is higher when workers from 'Shift A' are operating the IECSS instead of 'Shift B'. The action would be to interview and observe the differences between the two groups of workers, then assume a 'best operating practice' from the 'Shift A' habit. Another example of E2M may indicate where energy is wasted through underutilisation of equipment during production, such as conveyors still running when upstream equipment has faulted, has stopped for maintenance or not producing. The action would be to interlock with the controls of up-stream equipment to minimise downstream equipment run-times. Another example of E2M may indicate higher than expected actual natural gas consumptions and emissions of a boiler during periods of high ambient temperature. An action would be to inspect for thermal insulation failures, and check the calibration and operational efficiency of the gas burner. Another example of E2M may indicate that cement raw materials from Supplier 1 tend to be processed more efficiently into a cement product than materials from Supplier 2, and create fewer emissions. One action would be to undertake a laboratory analysis of raw material samples to identify the differences in raw material supply, then create a 'Quality Specification' of best practice supply for all Suppliers to meet. Another example of E2M may indicate that the size of 'run-of-mine' ore into a gold processing crushing plant influences the energy consumed throughout the process. An action would be to undertake a study using the E2M system archived data to determine the optimum fragment size of ore for energy-efficiency for crushing and grinding, then optimising a blast pattern for ore supply to the gold processing and recovery plant.

The expected or predicted ECGE of the IECSS can be outputs of (at least) two simultaneous but independent transfer functions developed from an initial period (days, weeks or years) of data sampling (hereinafter called "E2M Baseline") from the IECSS; one transfer function is derived from regression-based statistics and the other derived from artificial neural network-based statistics. The two methods are used simultaneously to provide prediction verification and to facilitate energy efficiency improvement investigations. In alternative embodiments, further (n) statistical methods may be added for simultaneous concurrence of results.

Embodiments can include the periodic volumetric summation of the actual energy-related direct and indirect greenhouse gas emission deviation from the E2M Baseline to verify greenhouse gas emissions offset by energy efficiency of the IECSS. For example, a monthly emission offset calculation consisting using: $CO_2$ Offset=$[\Sigma^0{}_n$ actual electricity kWh consumed$-\Sigma^0{}_n$ E2M Baseline_predicted electricity kWh consumed]*[internationally recognised greenhouse gas emission calculation factors]

Embodiments can also include the periodic substitution of time-series forecast IECSS information (such as production plan, staff roster plan, maintenance plan, raw material delivery schedules, energy trading futures pricing, gas supply upstream heating quality data, electricity supplier planned outages, biomass harvesting schedules, fuel delivery schedule) and/or meteorological data (such as weather forecast of wind, humidity, precipitation, solar or UV Index, tidal, wave, swell, water management plans) into the rolling time-series forecast model (hereinafter referred to as the "E2M Forecast") to predict the future ECGE of the IECSS for integration into the overall energy and emission trading strategy of the IECSS.

EXAMPLES

As an example, the IECSS is taken to be a brick-making facility using a natural gas-fired kiln. The production plan may indicate a 36 hour production run at the full capacity of two production lines, while the forecast meteorological conditions indicate above-average daily ambient temperature conditions for the period. The electricity supply market indicates higher on-peak day-time costs during high temperature days. The operator shift pattern indicates more experienced production staff available through the night-shift. The IECSS has a small combined-heat and power (CHP) generation station. An analytical strategy developed from the E2M system and method would indicate to run production for half capacity (run only one production line) for twelve hours (day-shift), followed by full capacity (both production lines) for twelve hours (night shift). Surplus gas-supply (from running at half capacity) can be diverted to the CHP, where electricity is supplied to the IECSS at a lower cost than the peak market rates, while delivering exhaust heat to the brick-drying section (reducing gas consumption further). During the following twelve hours (night shift) the CHP would be turned off to take advantage of low off-peak electricity prices, and to ensure full natural gas supply is delivered for full production rate. The net result is lower costs from electricity, and lower greenhouse gas emission from on-site CHP generation.

Analysis of the Method

The Energy Prediction System determines correlation of ECGE to influencing variables of the IECSS to produce baseline benchmark models. The resultant output consists of identifying real-time or near-real-time anomalies in ECGE using cross-verified prediction methods, and arranging optimising investigations. The outputs can also include predicting the future ECGE using cross-verified prediction methods for incorporation into the IECSS energy and emission trading strategy. This can lead to determining permanent optimisation improvements and provide a means of identifying the related ECGE costs saved while also providing evidence for Energy Efficiency-based emission trading credits. The method can continuously cycle for continuous improvement.

The FIRST step in the preferred embodiment of the invention, involves using the customisation criteria to: determine, identify and record the number and type of ECGE information gathering nodes, determine, configure, test and install the required number of E2M Monitoring Devices, determine the components, configure, program the parameters, test and install the E2M Monitoring device, determine the file and database structure, archiving convention, configuration, testing and installation of IECSS data transmitting/receiving, archiving, database, statistics and web portal software.

As noted previously, the Regression and Artificial Neural Network prediction systems can be formulated via transfer functions developed from an initial period of data sampling and are called the "Baseline Algorithms BL-i". Each transfer function will be a mathematical model that continuously relates the periodically sampled amounts of a particular form of energy consumption and/or the related greenhouse emissions to the characteristic operating factors (influencing factors) within the specific operating environment of the IECSS. The influencing factors within the specific operating environment of the IECSS may include, but are not limited to, production rate, types of product made, raw material quantities and characteristics, operating staff identification, ambient and process temperatures, ambient and process relative humidity's, solar radiation levels, pressures, ancillary equipment operating patterns (compressed air, boiler, air conditioning), sub-metering energy counters, gas monitoring equipment, mass flow metering, flue-gas analysers etc.

The analysis of the variance between the predicted and actual amounts of specific ECGE can graphically reproduced and periodically updated automatically to tables and charts that clearly show energy and emission reduction opportunities to an E2M manager. This analysis information is comprised of, but is not limited to, a summary of ECGE with regards to variances from the predicted or expected amounts, for example an analysis that includes at least one of summaries, graphs, charts and quantification of energy use and related emissions versus predicted or expected amounts, and that of variables that influence energy use and related emissions.

As noted previously, where site efficiency is an issue, the (linear and/or non-linear) Regression statistics will present the 'Priority Prediction' while the simultaneous trained Artificial Neural Network (hereinafter named "ANN") model will provide a 'Verification Prediction' to cross-match the transfer function outputs for acceptable Pass/Fail indication. In alternative embodiments, further (n) statistical methods may be added for simultaneous concurrence of results.

The 'Priority Prediction' will provide the diagnostic information on the variances to present the likely causes therefore. The E2M manager can use this diagnostic to investigate further at the IECSS using a 'Six-Sigma', 'LEAN' or other business improvement investigation method. Investigation outcomes will result in recommendations to the staff at the IECSS, such as a maintenance action or rescheduling of production, to reduce ECGE while improving productivity. This is an ongoing process.

Each time energy efficiency improvements are implemented at the IECSS, new Baseline Algorithms are developed. Reduced ECGE as a result of improved energy efficiency is quantified as a difference between the old and new baseline algorithms when substituting actual influencing data into both.

Further to energy and emission reduction opportunities, the E2M may apply forecast predictions on the ECGE of an IECSS. Substituting meteorological forecast information (such as ambient temperature, solar intensity, and relative humidity), production schedule information, maintenance activity planning information, staff roster information, and historical time-series data from the IECSS into the prediction algorithms will generate a forecast total energy use profile, along with associated greenhouse gas emission forecast. In this instance, the trained Artificial Neural Network (hereinafter named "ANN") model can present the 'Priority Prediction' while the simultaneous (linear and/or non-linear) Regression statistics will provide a 'Verification Prediction' to cross-match the transfer function outputs for acceptable Pass/Fail indication. In alternative embodiments, further (n) statistical methods may be added for simultaneous concurrence of results.

Although the invention has been described with reference to specific examples it will be appreciated by those skilled in the art that the invention may be embodied in many other forms.

The claims defining the invention are as follows:

1. A method of performing energy estimations operations in an intensive energy consuming site or system environment, the method comprising the steps of:
   (a) inputting a series of energy, emission and influencing data variables related to the intensive energy consuming site or system environment;
   (b) performing a first energy use prediction operation on the series of energy, emission, and influencing data variables utilising a regression prediction technique;
   (c) performing a second similar energy use prediction operation on the series of energy, emission, and influencing data variables utilising an artificial neural network prediction technique, wherein the first energy use prediction operation and the second energy use prediction operation occur substantially simultaneously;
   (d) correlating the results of the two techniques and;
   (e) providing an output signal indicative of the level of correlation between the two techniques.

2. A method as claimed in claim 1 wherein said method is performed to determine the environments efficiency.

3. A method as claimed in claim 1 wherein said method is performed to predict or forecast the future energy needs and/or related emissions of the environment.

4. A method as claimed in claim 1 wherein the energy data variables include a measure of greenhouse gas emissions from energy use to the environment.

5. A method as claimed in claim 1 wherein said method is performed in a continuous manner.

6. A method as claimed in claim 1 further comprising the steps of:
   (c1) performing at least one further energy use prediction operation utilising a further prediction technique, wherein the further prediction technique is different from the regression prediction technique and the artificial neural network prediction technique; and
   (e1) providing a further output signal indicative of the level of correlation between all the energy use prediction operations.

7. A system for performing energy estimations operations in an intensive energy consuming site or system environment, the system including:
   input means for sensing and inputting a series of energy, emission, and influencing data variables relating to energy or emissions from the site or system environment;

data storage means for storing time series data from the input means;

first prediction unit trained from data stored in the data storage means, including the series of energy, emission, and influencing data variables, utilising a regression prediction technique to output a first prediction;

second prediction unit trained from data stored in the data storage means, including the series of energy, emission, and influencing data variables, utilizing an artificial neural network prediction technique to output a second prediction, wherein the regression prediction technique and the artificial neural network prediction technique are performed substantially simultaneously; and comparison means for comparing the first and second prediction and outputting a measure of the difference there between.

8. A system as claimed in claim 7 wherein said first prediction unit utilises a regression prediction technique and said second prediction unit utilises a neural network technique.

* * * * *